(12) United States Patent  
Cristini (10) Patent No.: US 8,138,769 B2
(45) Date of Patent: Mar. 20, 2012

(54) METHOD AND DEVICE FOR MEASURING THE THICKNESS OF A LAYER OF MATERIAL

(75) Inventor: Giovanni Cristini, Bergamo (IT)

(73) Assignee: S.A. Giuseppe Cristini S.p.A., Milan (IT)

( * ) Notice: Subject to any disclaimer, the term of this patent is extended or adjusted under 35 U.S.C. 154(b) by 685 days.

(21) Appl. No.: 12/161,441

(22) PCT Filed: Nov. 6, 2006

(86) PCT No.: PCT/IB2006/003207

§ 371 (c)(1),
(2), (4) Date: Jan. 21, 2009

(87) PCT Pub. No.: WO2007/083178

PCT Pub. Date: Jul. 26, 2007

(65) Prior Publication Data

US 2009/0302865 A1    Dec. 10, 2009

(51) Int. Cl.
*G01R 35/00* (2006.01)
*G01R 27/08* (2006.01)
*G01B 7/06* (2006.01)

(52) U.S. Cl. ......... 324/637; 324/601; 324/693; 324/644
(58) Field of Classification Search .................. 324/637
See application file for complete search history.

(56) References Cited

U.S. PATENT DOCUMENTS

| 4,255,709 A * | 3/1981 | Zatsepin et al. ............. 324/229 |
| 7,794,142 B2 * | 9/2010 | Clothier et al. .............. 374/163 |
| 2004/0194257 A1 | 10/2004 | Dammig et al. |

FOREIGN PATENT DOCUMENTS

| FI | 2006A000019 | 4/2006 |
| GB | 1 118 096 | 6/1968 |
| IT | FI2006A00019 A1 * | 7/2007 |
| WO | WO 00/12974 | 3/2000 |

OTHER PUBLICATIONS

PCT International Search Report for PCT Counterpart Application No. PCT/IB2006/003207 containing Communication relating to the Results of the Partial International Search Report, 2 pgs., (Jun. 28, 2007).

* cited by examiner

*Primary Examiner* — Jay Patidar
(74) *Attorney, Agent, or Firm* — Blakely, Sokoloff, Taylor & Zafman LLP (57) ABSTRACT

Described herein is a method for measuring, via a microwave sensor, the thickness of a layer of first material, said method envisaging: acquiring at least one frequency response of the layer of first material via a microwave sensor; setting the microwave sensor on a plurality of specimens of second materials for different temperature values in such a way as to obtain reference data; calibrating the microwave sensor as a function of the electrical conductivity of the first material using the reference data; measuring the temperature of the layer of first material via a temperature sensor; determining measurement parameters from the frequency response; and processing the reference data with the measurement parameters to obtain a measurement of the thickness of the layer of first material.

18 Claims, 10 Drawing Sheets

METHOD AND DEVICE FOR MEASURING THE THICKNESS OF A LAYER OF MATERIAL

CROSS-REFERENCE TO OTHER APPLICATIONS

This is a National Phase of International Application No. PCT/IB2006/003207, filed on Nov. 6, 2006, which claims priority from Italian Patent Application No. MI2006A 000084, filed on Jan. 19, 2006.

TECHNICAL FIELD

The present invention relates to a method and a device for measuring the thickness of a layer of material.

In particular, the present invention finds advantageous, but non-exclusive, application in the measurement of the thickness of a layer of a paper pulp in a draining station of a papermaking machine, to which the ensuing description will make explicit reference, without this, however, implying any loss of generality.

BACKGROUND ART

As is known, in a papermaking machine, a layer of paper pulp, in which the part of water is approximately 98%, is fed along a path for production of the paper, which traverses, in succession, a station for draining the layer of paper pulp, a station for pressing the layer of paper pulp, and a station for drying the layer of paper pulp.

A first portion of the production path that traverses the draining station defines a draining path, along which the layer of paper pulp advances laid on a fabric that rotates in a loop. Set underneath the fabric are, at a regular distance from one another, a plurality of suction units for aspirating the water, through the fabric, from the paper pulp as it advances.

A high efficiency of the draining station reduces the cost of the treatment carried out by the drying station downstream.

For the above purpose, existing on the market are devices for controlling the thickness of water in the paper pulp, which comprise a rod, mounted on which is a read head provided with a sensor for measurement of the amount of water. These devices are usually positioned manually in such a way that the sensor is brought into contact with the bottom surface of the fabric between one suction unit and another.

Said devices use various types of sensors, for example sensors that exploit GBS (Gamma Back Scattering) technology for detecting the consistency of the material with which they come into contact. Said technology is accurate but requires the presence of a radioactive source inside the read head and is consequently costly and impractical. Other sensors exploit ultrasound and are hence less costly than the previous ones, but also more difficult to use in noisy environments, such as those of papermaking machines. Yet other sensors exploit microwaves, and in particular estimate the consistency of the material from the frequency response of the material itself, but are cumbersome and do not yield sufficiently reliable measures.

DISCLOSURE OF THE INVENTION

The aim of the present invention is to provide a method and a device for measuring the thickness of a layer of material, and in particular the thickness of water of a layer of paper pulp and water for the production of paper, that will be free from the drawbacks described above and at the same time will be easy and inexpensive to produce.

In accordance with the present invention, a method and a device are provided for measuring the thickness of a layer of material according to what is defined in the attached independent claims and, preferably, in any one of the claims that depend either directly or indirectly upon the aforementioned independent claims.

BRIEF DESCRIPTION OF THE DRAWINGS

For a better understanding of the present invention, a preferred embodiment thereof is now described, purely by way of non-limiting example and with reference to the attached plate of drawings, wherein.

BEST MODE FOR CARRYING OUT THE INVENTION

Figure 1A:
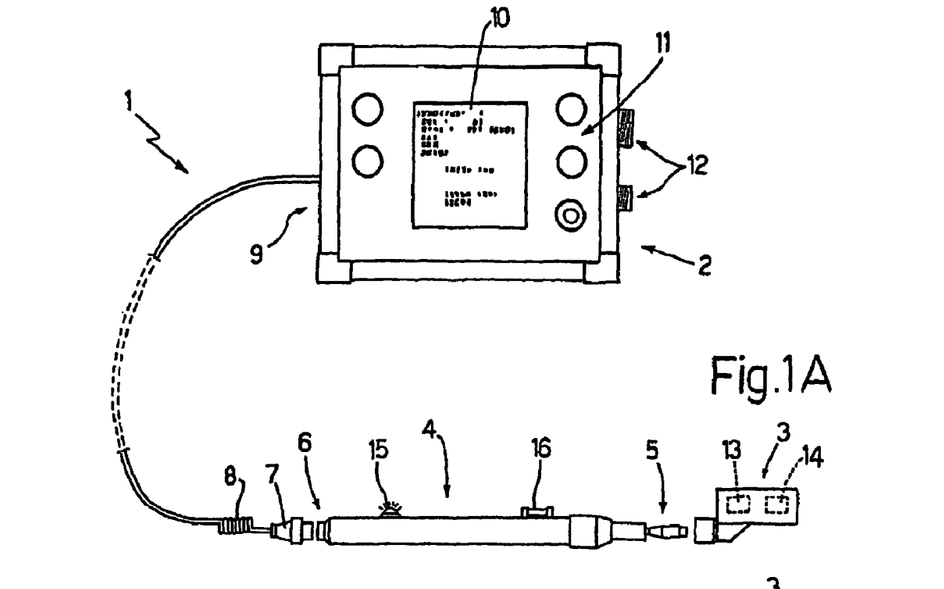
FIG. 1A and FIG. 1B illustrate a preferred embodiment of the device for measuring the thickness of a layer of material according to the present invention.

In FIG. 1A, the reference number 1 designates, as a whole, the device for controlling the thickness of a material, said device 1 comprising: a control unit 2; a read head 3, designed to be set in contact with a layer of material (not illustrated) and in particular a layer of paper pulp and water in order to measure the thickness thereof; and a supporting rod 4, having a first end 5, in a position corresponding to which the read head 3 is mounted, and a second end 6, mounted on which is a connector 7 provided with an electrical cable 8 for connection of the read head 3 to the control unit 2.

The control unit 2 comprises a front control panel 9 provided with a display 10, for example of the backlighted liquid-crystal type with a resolution of 128×128 pixels, for displaying information on the measurements, and a keypad 11, via which an operator can impart commands on the control unit 2. The control unit 2 further comprises a plurality of connectors 12 for connection to the read head 3 and with further external control devices (not illustrated), for example a personal computer.

The read head 3 comprises a microwave sensor 13 and a temperature sensor 14. In particular, the microwave sensor 13 is, for example, of the type described in the Italian patent application No. FI2006A000019, filed on Oct. 19, 2006 in the name of ADVANCED MICROWAVE ENGINEERING, and comprises a microwave transmitter and a respective microwave receiver for detecting, through the material, the signals generated by the transmitter. In particular, the sensor 13 is characterized by a frequency-response curve substantially centred around a resonance frequency, for which there is a minimum value of amplitude. The presence of the material in the neighbourhood of the sensor 13 modifies the response curve, in terms of shift of the resonance frequency and of variation of the minimum amplitude, in a way that depends upon the physical characteristics of the material itself.

Figure 1B:
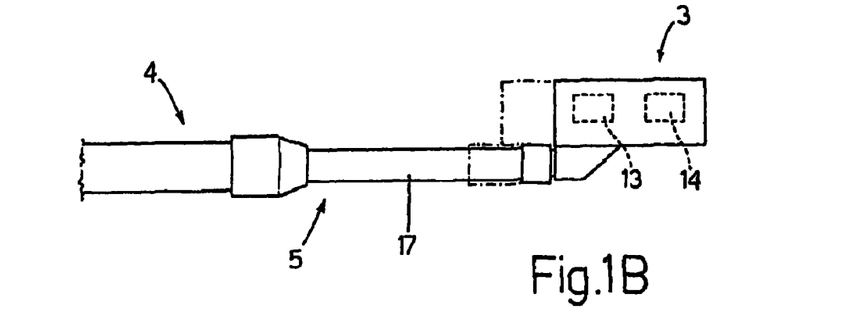

The supporting rod 4 is provided with a signalling element 15, for example of an optical type or else of an acoustic type, for signalling that the measurement is in progress, and with a small level 16 for verifying proper positioning of the supporting rod 4 and, hence, of the read head 3. In greater detail, as illustrated in FIG. 1B, the supporting rod 4 comprises a telescopic arm 17, which is extensible at its first end 5 and mounted on which is the read head 3.

Figure 2:
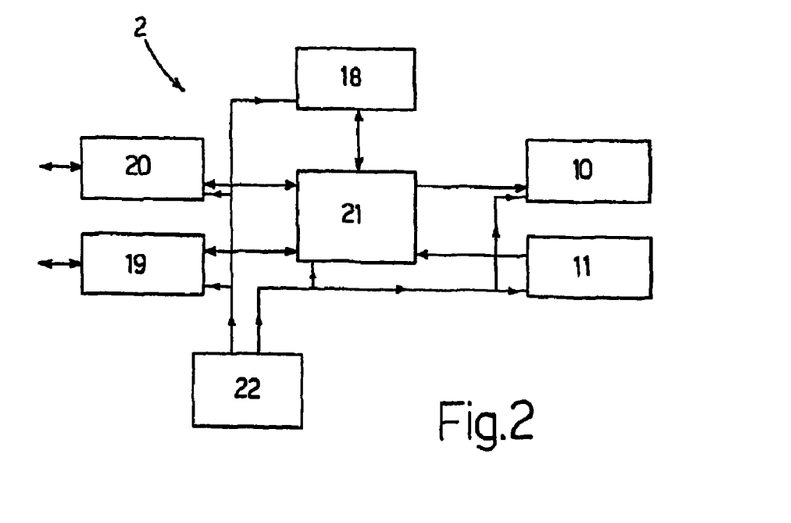
FIG. 2 illustrates a block diagram of a control unit of the device of FIG. 1.

With reference to FIG. 2, the control unit 2 comprises, in addition to the aforementioned display 10 and keypad 11, a storage unit 18, for example a removable flash memory of the type referred to as "smart media card", designed to store the data on the measurements, an interface unit 19, for communication with the external control devices, an interface unit 20 for communication with the sensors 13, 14, a processing unit 21, for example of the type comprising a microcontroller, connected for communication with the display 10, with the keypad 11, and with all the other units mentioned above, and a supply unit 22, which is designed to supply electrically all the units mentioned above.

In greater detail, the display 10 is designed to display the state of the sensors 13, 14, the data regarding the measurement in progress, and the statistics regarding the previous measurements. Amongst the commands that can be imparted via the keypad 11 there is, for example, the number of measurement samples to be acquired via the device 1.

The supply unit 22 comprises a battery (not illustrated), preferably of the rechargeable type, and a supervision and signalling circuit (not illustrated either), for monitoring the residual level of charge of the battery, to said level there being associated an appropriate indicator represented, for example, via a warning light or via an icon displayed on the display 10.

Each of the interface units 19, 20 is constituted, for example, by a serial port of the RS232 or USB type.

FIGS. 3 to 7 show respective portions of a flowchart of the method for measuring the thickness of a layer of a material according to the present invention, said method being implemented in a control program (firmware) loaded into the microcontroller of the processing unit 21.

The principle underlying the method for measuring the thickness of a layer of a material consists in: obtaining reference data from a setting of the microwave sensor 13 carried out in laboratory on specimens of known materials in known physical conditions; calibrating the sensor 13 on the basis of the electrical conductivity of the material under examination, i.e., of the material of the layer to be measured, using, for example, a specimen of said material; and determining a measurement of the thickness from a frequency response of the layer of material, acquired by means of the sensor 13, and as a function of the temperature Tm of the layer of material measured with the sensor 14.

Figure 3:
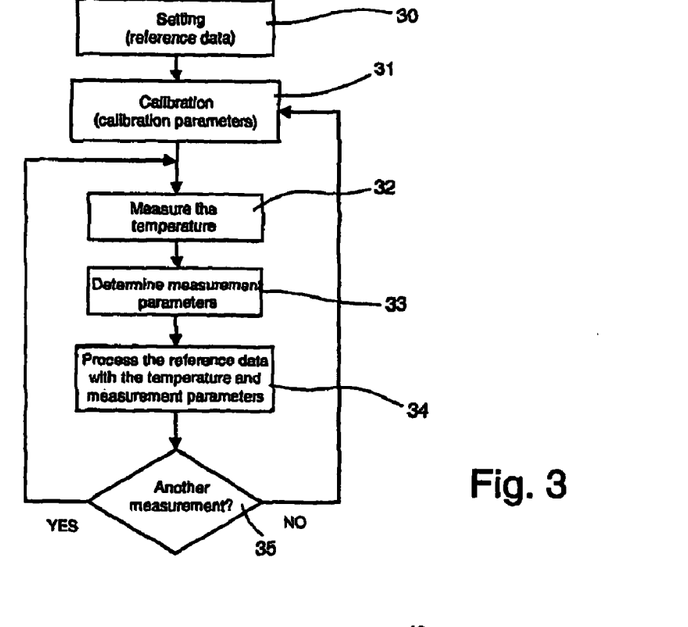
FIGS. 3 to 8 illustrate, as a whole, a flowchart of the method for measuring the thickness of a layer of material according to the present invention.

With reference to FIG. 3, the method for measuring the thickness of a layer of material envisages a step of setting of the sensor 13 (block 30) on specimens of materials that have respective given values of electrical conductivity for temperature values determined in such a way as to obtain the reference data; a step of calibration of the sensor 13 (block 31) as a function of the electrical conductivity of the material under examination, i.e., of the material of the layer to be measured using the reference data for determining calibration parameters; a step of measurement of the temperature Tm of the layer of material under examination (block 32); a step of determination of measurement parameters of the layer of material from a frequency response of the layer itself using the calibration parameters (block 33); and a step of processing of the reference data with the measurement parameters and the temperature Tm for determining a measurement Sm of the thickness of the layer itself (block 34).

The steps indicated with blocks 32, 33 and 34 are repeated, whenever required, to obtain a measurement of the thickness; otherwise, control returns to the calibration step (block 35).

Figure 4:
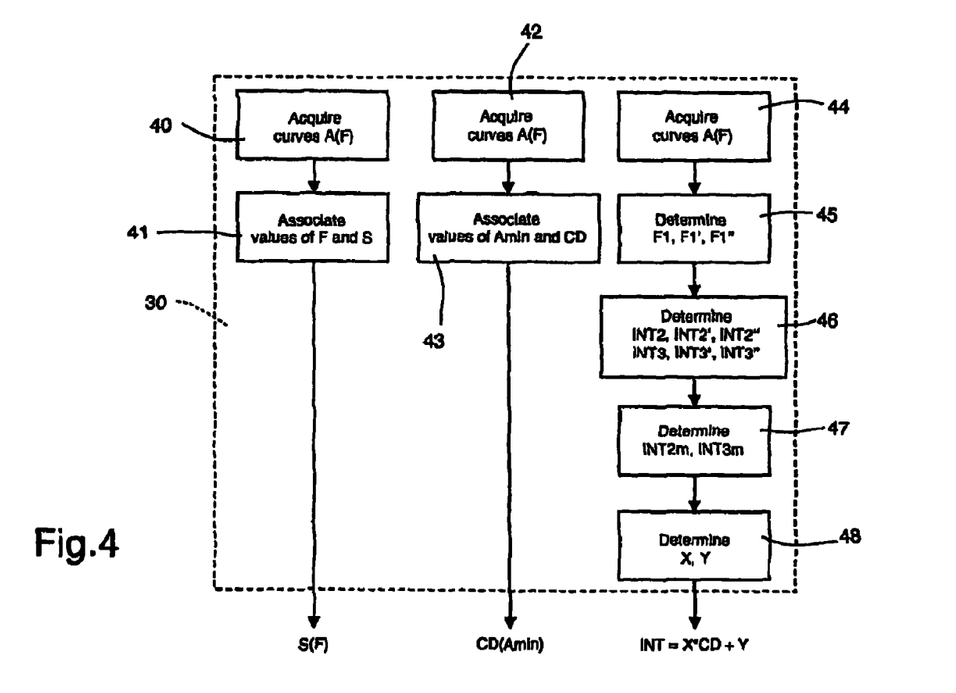

The step of setting of the sensor 13 (block 30 of FIG. 3) is carried out once and for all in the laboratory and is illustrated, in all its substeps, in FIG. 4 and described hereinafter.

The step of setting of the sensor 13 envisages, in the first place, obtaining reference data constituted by data of thickness S of a material determined as the working frequency F of the sensor 13 varies in a frequency band FB, comprised between a minimum value Fmin and a maximum value Fmax, and for given temperature values T1, T2, T3.

Said data of thickness S as a function of the frequency F are obtained by: acquiring, via the sensor 13, for each value of temperature T1, T2, T3, a plurality of frequency-response curves of a respective plurality of specimens of a material having a value CD1 of electrical conductivity, each specimen having a respective value of substance or thickness S (block 40); and associating to each value of thickness S a respective value of frequency F identified by the intersection of the response curve corresponding to said value of thickness S with a function that is constant in frequency, referred to hereinafter, for reasons of convenience, as "intercept straight line" (block 41).

Figures 9, 10:
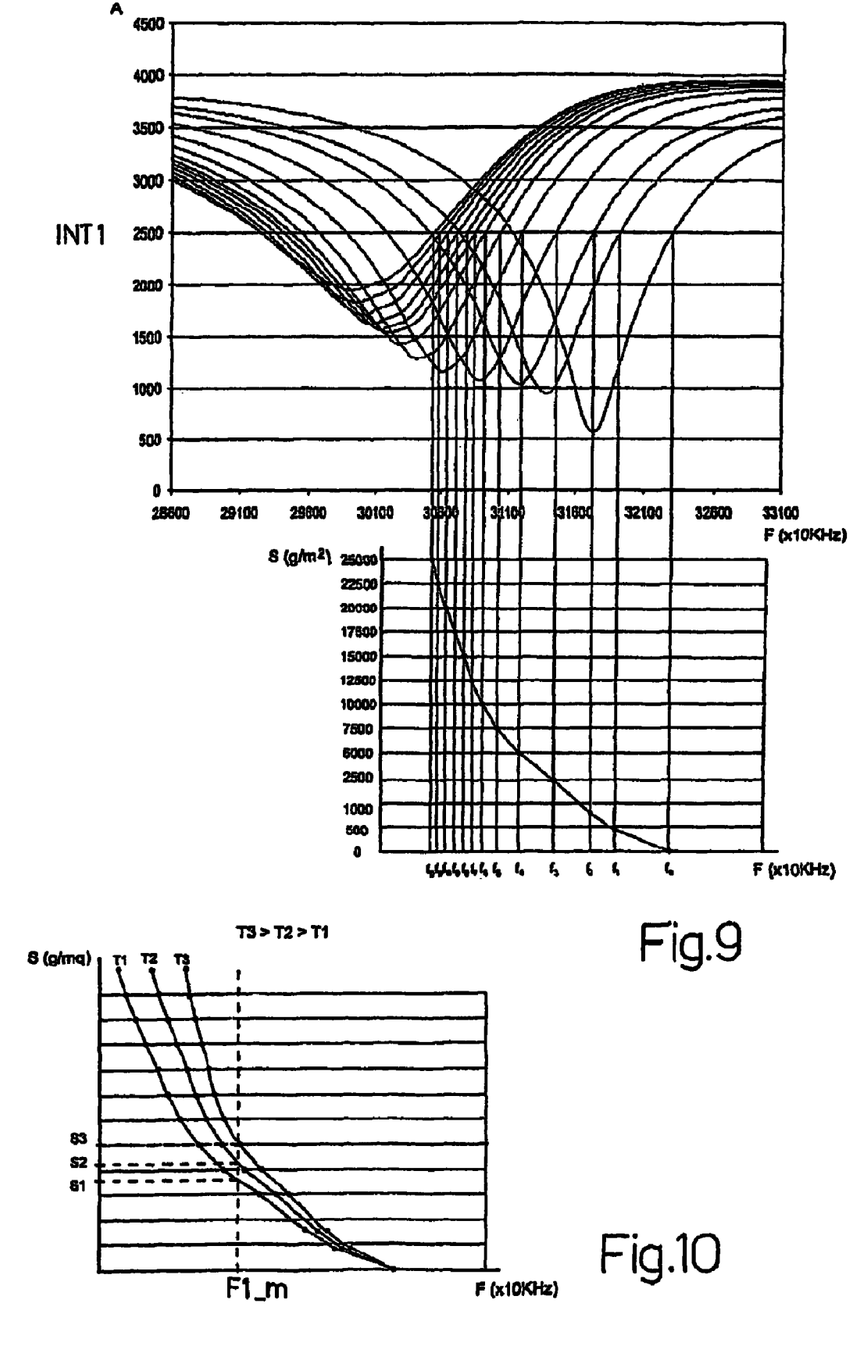
FIGS. 9 to 14 illustrate examples of frequency-response curves of specimens of materials and of corresponding setting and calibration curves of the device of FIG. 1, obtained and used following the method for measuring the thickness of a layer of material according to the present invention.

FIG. 9 is a graphic illustration of an example of how to obtain the data of thickness S as the frequency F varies for any of the temperature values T1, T2, T3.

The graph in the top part in FIG. 9 illustrates the frequency-response curves, which are constituted by as many patterns of amplitude A of the output signal of the sensor 13 as the frequency F varies in the band FB for the different values of the thickness S. The amplitude A is dimensionless in so far as the output of the sensor 13 corresponds to the output of an A/D converter of the sensor 13. The intercept straight line assumes a first value INT1 substantially equal to half of the output range of the A/D converter, and in particular equal to 2500. Each value of frequency F associated to the respective value of thickness S is defined by the intersection of the intercept straight line of value INT1 with the increasing stretch of the frequency-response curve corresponding to the value of thickness S itself.

The graph at the bottom of FIG. 9 represents an example of pattern of the thickness S as a function of the frequency F obtained associating the values of frequency F obtained to the values of thickness S.

FIG. 10 illustrates examples of curves of the thickness S as a function of the frequency F for the different temperature values T1, T2 and T3 that increase so that T3>T2>T1, and preferably are equal to 10° C., 35° C., and 60° C., respectively.

The data of thickness S as a function of the frequency F for the three temperature values T1, T2 and T3 are gathered in a corresponding look-up table stored in the storage unit 18.

The step of setting of the sensor 13 moreover envisages obtaining other reference data, constituted by data of electrical conductivity CD as a function of the minimum amplitude Amin of the output signal of the sensor 13 at a constant ambient temperature of value Tamb.

Once again with reference to FIG. 4, the data of conductivity CD as a function of the minimum amplitude Amin are obtained by: acquiring, via the sensor 13, a plurality of frequency-response curves, in the frequency band FB, of a respective plurality of specimens of materials that each have a respective value of electrical conductivity CD (block 42); and associating, to each value of electrical conductivity CD, the value of minimum amplitude Amin of the frequency-response curves of the specimen that has said value of electrical conductivity CD (block 43).

Figure 11:
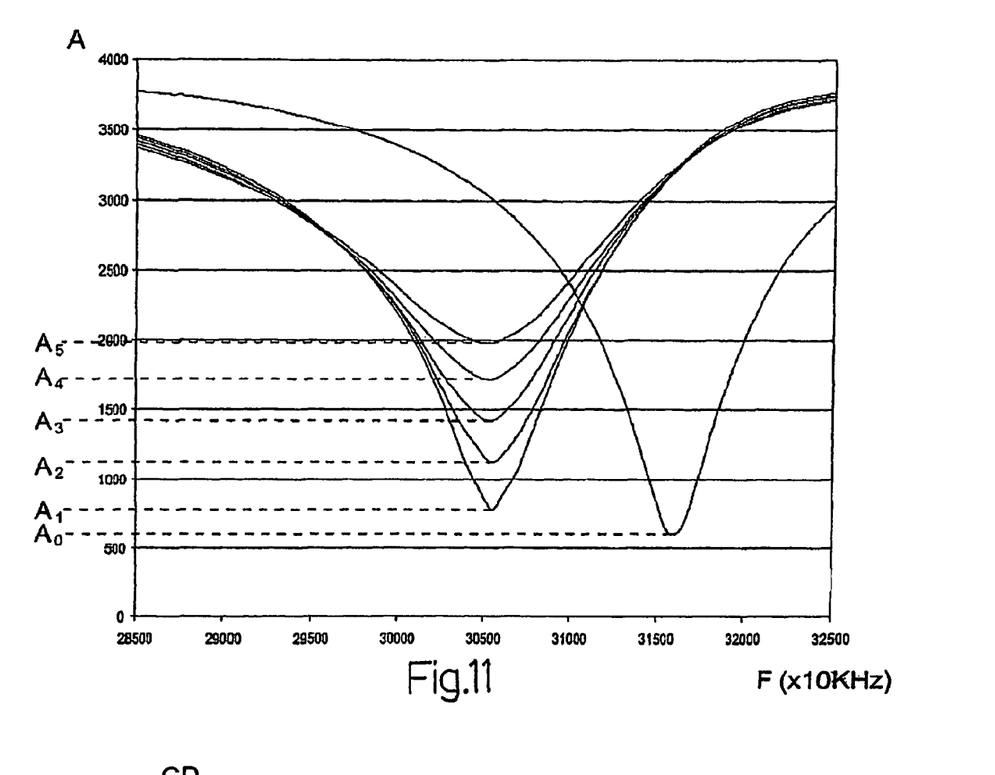
Figure 12:
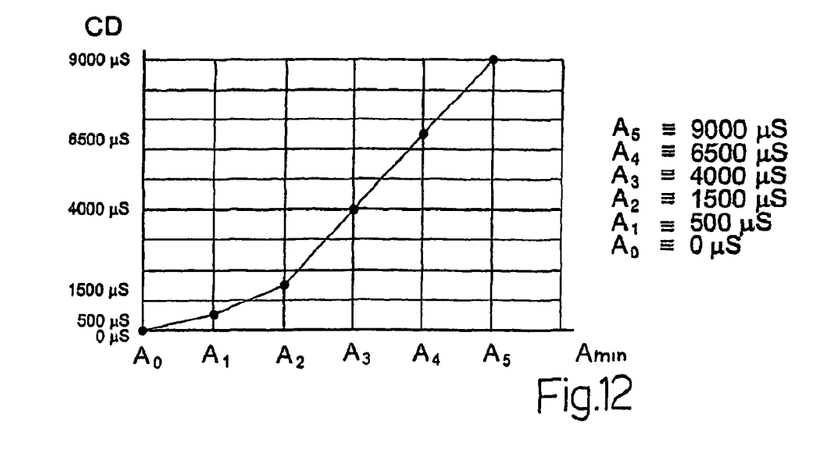

FIG. 11 illustrates examples of frequency-response curves of materials having different values of the electrical conductivity CD and highlights the values of minimum amplitude Amin of each curve designated by $A_0, A_1, A_2, A_3, A_4$ and $A_5$. Said minima occur at the resonance frequency of the corresponding material. FIG. 12 shows an example of pattern of the electrical conductivity CD as a function of the minimum amplitude Amin obtained from the data derived from FIG. 11.

The data of electrical conductivity CD as a function of the minimum amplitude Amin at ambient temperature Tamb are gathered in a corresponding look-up table stored in the storage unit 18.

Finally, the step of setting of the sensor 13 envisages determining a linear function between the generic value INT of intercept straight line and the electrical conductivity CD of the material under examination at constant temperature, and in particular at the value of temperature T2. In other words, the step of setting envisages determining further reference data constituted by the coefficients X and Y that identify a linear function of the type INT=X*CD+Y.

In particular, once again with reference to FIG. 4, the step of setting of the sensor 13 envisages acquiring, via the sensor 13 itself, three sets of frequency-response curves for three different values of reference thickness SR, SR', SR" of material, in which each group of curves comprises three frequency-response curves of three materials having respective values of electrical conductivity CD1, CD2, CD3 (block 44).

The values of electrical conductivity CD1, CD2 and CD3 are increasing so that CD3>CD2>CD1, and preferably equal to 1500, 4000, and 6500 µS/cm, respectively. The values of reference thickness SR, SR' and SR" are decreasing and preferably equal to 25000, 10000, and 5000 g/m², respectively.

For each of said groups of frequency-response curves, the following data are determined: a respective value of frequency F1, F1', F1" from the intersection of the curve corresponding to the material with electrical conductivity CD1 with the intercept straight line of a first value INT1 (block 45); a second value INT2, INT2', INT2", and a third value INT3, INT3', INT3" that the intercept straight line must assume for identifying the same value of frequency F1, F1', F1" in the presence of the material with electrical conductivity having value CD2 and, respectively, CD3 given the same reference thickness SR, SR' and SR" (block 46).

At this point, the values INT1, INT2, INT2', INT2", INT3, INT3', and INT3", corresponding to the different values of reference thickness SR, SR' and SR" are averaged with one another in such a way as to obtain a mean value INT1, INT2m, INT3m of intercept straight line for each value of electrical conductivity CD1, CD2, CD3 (block 47). The coefficients X and Y are determined according to the series of values of electrical conductivity CD1, CD2, CD3 and of the respective series of mean values INT1, INT2m, INT3m using any known linear-regression technique (block 48).

Figure 13:
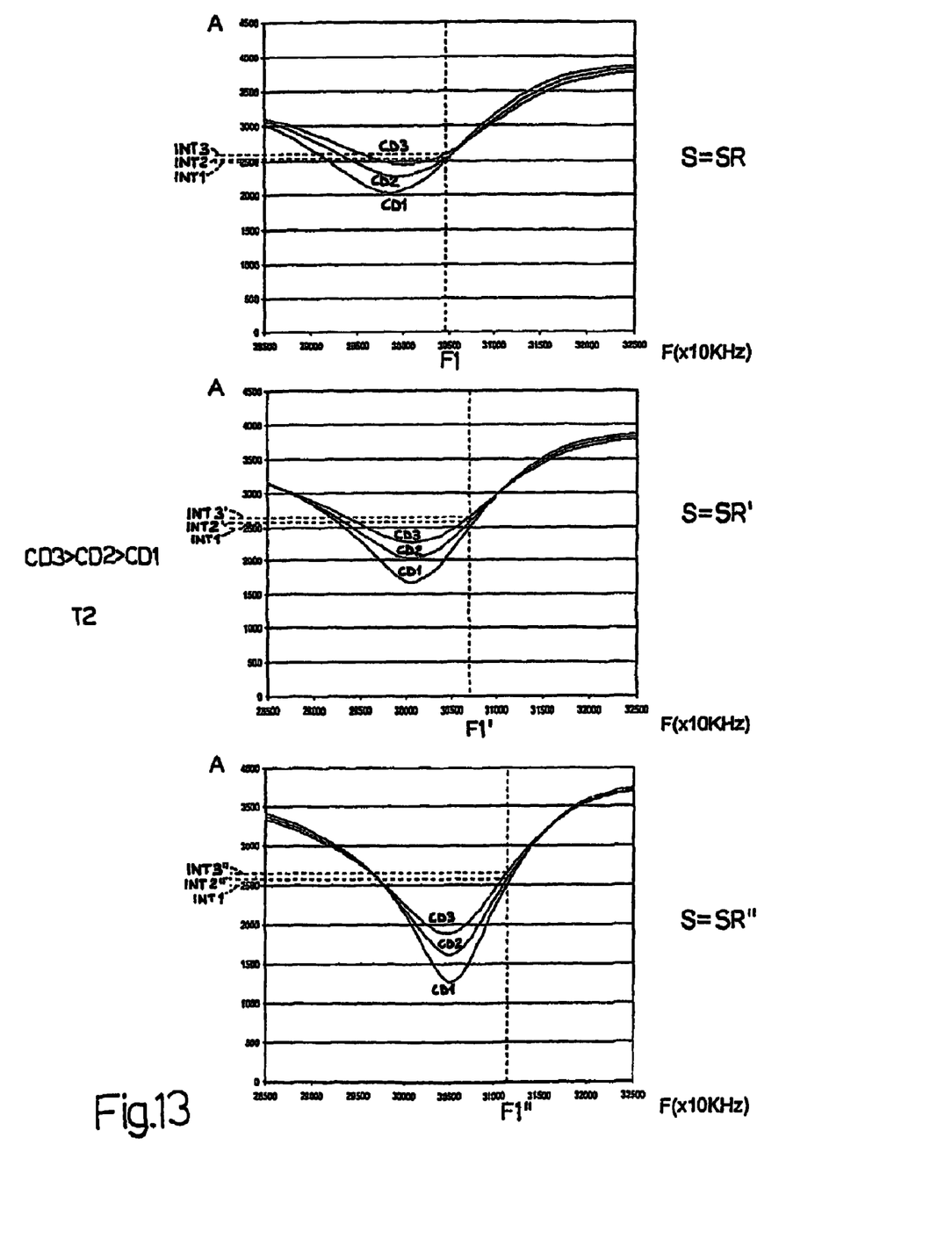

FIG. 13 illustrates an example of determination of the values INT2, INT2', INT2", INT3, INT3' and INT3".

Figure 14:
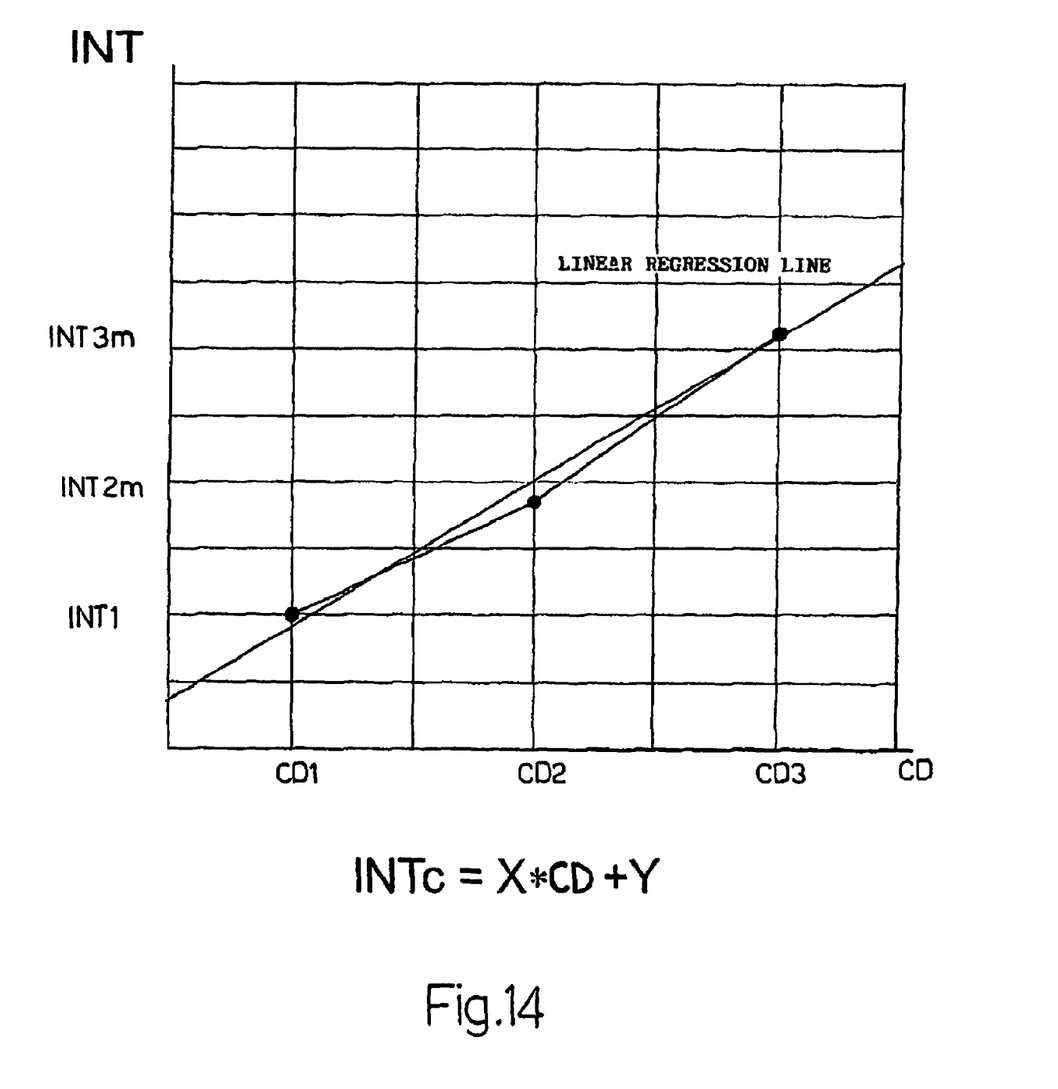

FIG. 14 illustrates an example of linear relation between the value INT of intercept straight line and the electrical conductivity CD obtained by linear regression. Also the coefficients X and Y are stored in the storage unit 18.

The step of calibration of the sensor 13 (block 31 of FIG. 3) has the purpose of determining a calibration parameter constituted by a value INTc of the intercept straight line in the presence of a specimen of the material under examination at the constant ambient temperature of value Tamb.

The calibration is carried out previously by immersing the read head 3 in a purposely provided calibration cup containing a specimen of the material under examination. Alternatively, the calibration is carried out automatically by the device 1 during the normal operations of measurement of the thickness of the layer of material.

In general, the step of calibration envisages: acquiring frequency-response curves of the material under examination in the frequency band FB similar to the ones illustrated in FIGS. 9 and 10; finding a value of minimum amplitude Amin_c of said curves; and processing said value of minimum amplitude Amin_c to obtain the value INTc of the intercept straight line.

Figure 5:
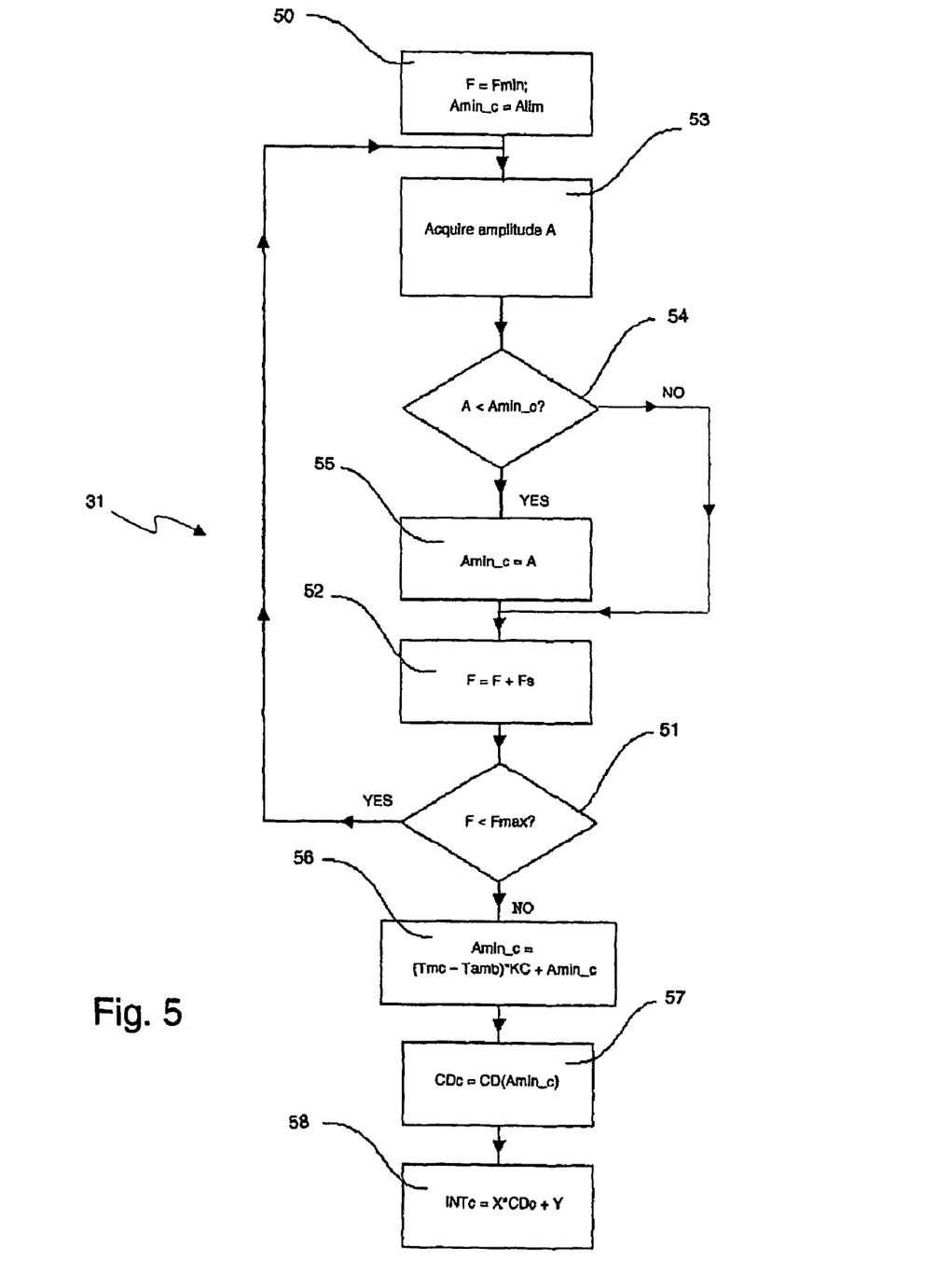

In particular, with reference to FIG. 5, acquisition of the frequency-response curves occurs by: incrementing the frequency F from the minimum value Fmin (block 50) to the maximum value Fmax (block 51) according to a given frequency step Fs in particular of a value of 10 kHz (block 52); and acquiring a value of amplitude A of the signal at output from the sensor 13 for each value of frequency F set (block 53).

The value of minimum amplitude Amin_c of the curve is found by: initially setting the minimum amplitude Amin_c at a sufficiently high value, and in particular at a maximum value Alim of the dynamic output range of the sensor 13 equal to 4095 (block 50); comparing, for each value of frequency F set, the minimum amplitude Amin_c set with each value of amplitude A acquired (block 54); and replacing the minimum amplitude Amin_c set with the value of amplitude A in the case where the latter is lower (block 55).

Once the value of minimum amplitude Amin_c is identified, it is compensated according to the relation:

$$Amin\_c=(Tmc-Tamb)*KC+Amin\_c,$$

where Tmc corresponds to the temperature of the material during the step of measurement proper and can be set by the operator via the keypad 11 during the present step of calibration, and KC is a coefficient that depends upon the mechanical and electronic characteristics of the read head 3 and is purposely determined in the laboratory in an empirical way (block 56).

Next, a measurement of the electrical conductivity CDc of the material under examination is determined, by extracting it, by means of interpolation, from the data of electrical conductivity CD using the value of minimum amplitude Amin_c (block 57), and a value INTc of intercept straight line is determined as a function of the value of electrical conductivity CDc using the coefficients X and Y, i.e., using the linear function of the type illustrated in FIG. 14 (block 58).

At this point, once the steps of setting and calibration of the sensor 13 have been completed, the operations that lead to the determination of a measurement of the thickness are carried out.

The measurement of the temperature Tm of the material under examination (block 32 of FIG. 3) is followed, as has already been mentioned previously, by the step of determination of measurement parameters (block 33 of FIG. 3). Said measurement parameters comprise a value of intercept frequency F1_m determined for a range of values of amplitude A of a frequency response of the layer of material acquired via the sensor 13, said range being substantially centred around the value INTc of the intercept straight line obtained during the calibration of the sensor 13.

Figure 6:
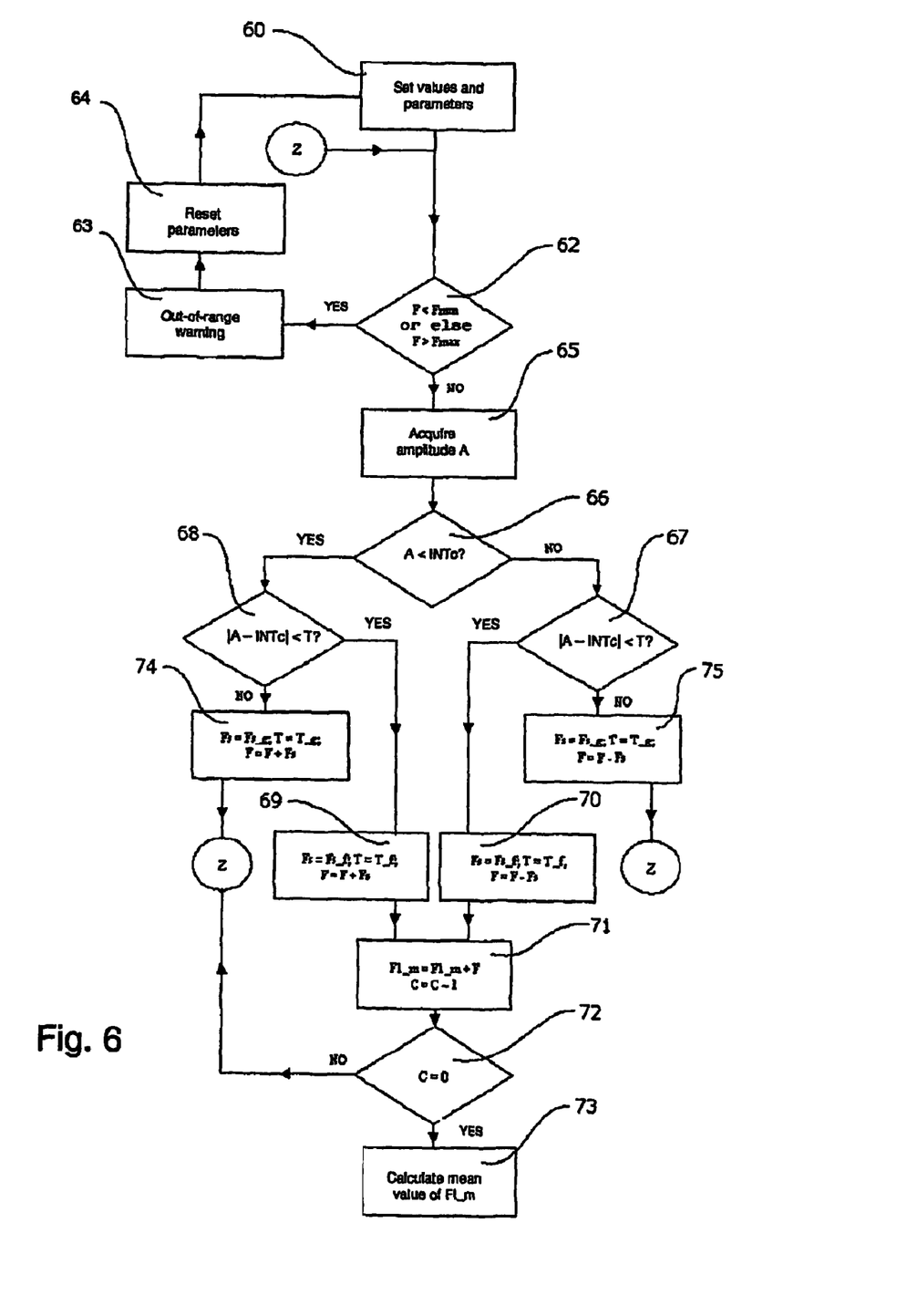

More precisely, with reference to FIG. 6, the determination of the mean value F1_m of frequency comprises the steps of:

initially setting the working frequency F of the sensor 13 to the maximum value Fmax, the frequency step Fs to a maximum or coarse value Fs_g, in particular equal to 1 MHz, a tolerance T of the amplitude A to the highest value that can be selected, i.e., to the maximum or coarse value T_g, a counter of calculation iterations C to a determined value N of iterations, the intercept straight line to the value INTc of intercept straight line determined previously with the calibration of the sensor 13, and the intercept frequency F1_m to a starting zero value (block 60);

comparing the current value of the frequency F with the maximum value Fmax and the minimum value Fmin (block 62) to enable warning of possible out-of-range settings of the frequency F (block 63) and consequently resetting the parameters set in the previous step represented by block 60 (block 64);

acquiring a value of amplitude A of the signal at output from the sensor 13 (block 65); and comparing the value of amplitude A acquired with the value INTc of intercept straight line (block 66) and comparing the difference, in absolute value, between the value of amplitude A and the value INTc with the value of tolerance T set (blocks 67 and 68) in order to distinguish the cases described hereinafter.

If both of the conditions below are satisfied:

$A < INTc$; and $|A - INTc| < T$, then the frequency step Fs is set to a minimum or fine value Fs_f (Fs=Fs_f), and the tolerance T to a minimum or accurate value T_f (T=T_f), and the frequency F is incremented by the frequency step Fs (F=F+Fs) (block 69), and the flow proceeds with the subsequent block 71. The minimum value of tolerance T_f is, for example, equal to 1% of the value of INTc of the intercept straight line.

If both of the conditions below are satisfied:

$A < INTc$; and $|A - INTc| \geq T$, then the frequency step Fs is set to the maximum value Fs_g (Fs=Fs_g), and the tolerance T to its maximum value T_g (T=T_g), the frequency F is incremented by the frequency step Fs (F=F+Fs) (block 74), and control returns to block 62.

If both of the conditions below are satisfied:

$A \geq INTc$; and $|A - INTc| < T$, then the frequency step Fs is set to the minimum value Fs_f (Fs=Fs_f), the tolerance T is set to the minimum value T_f (T=T_f), the frequency F is decremented by the frequency step Fs (F=F−Fs) (block 70), and the flow proceeds with the subsequent block 71.

If both of the conditions below are satisfied:

$A \geq INTc$; and $|A - INTc| \geq T$, then the frequency step Fs is set to the maximum value Fs_g (Fs=Fs_g), and the tolerance T to the maximum value T_g (T=T_g), the frequency F is decremented by the frequency step Fs (F=F−Fs) (block 75), and control returns to block 62. Following upon increment or decrement of the frequency F by the frequency step Fs from or to the minimum value Fs_f (output of block 69 or block 70), the following steps are envisaged:

accumulating the current frequency value F adding it to the intercept frequency F1_m (F1_m=F1_m+F) and decrementing by one the counter of iterations of calculation C (C=C−1) (block 71);

verifying the residual number of iterations of calculation (block 72): if said number is zero (C=0), then the flow proceeds with the next block 73; otherwise control returns to block 62; and calculating the value of intercept frequency F1_m sought as mean value of the values accumulated (block 73).

Figure 15:
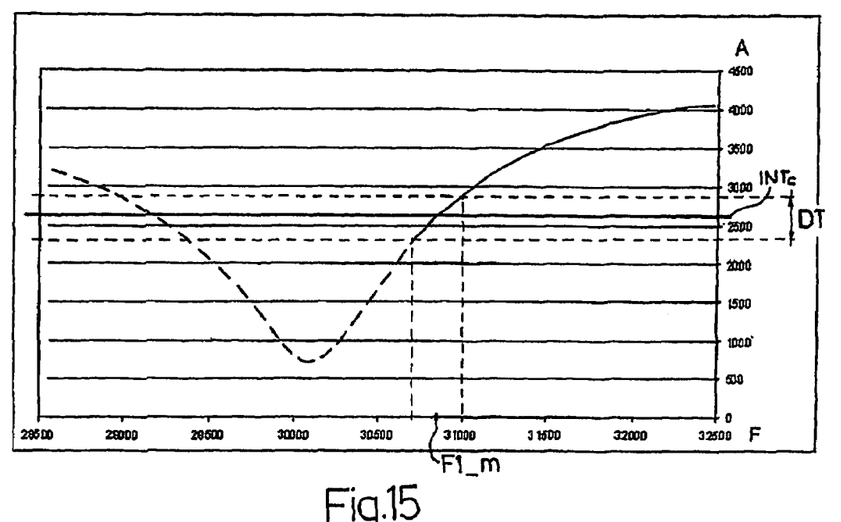
FIGS. 15 and 16 illustrate examples of frequency responses of the layer of material acquired and processed following the method for measuring the thickness of a layer of material according to the present invention.

FIG. 15 illustrates an example of determination of the value of intercept frequency F1_m. As may noted, the frequency response is acquired by decrementing the working frequency F of the sensor 13 starting from the maximum value Fmax up to values of frequency corresponding to values of amplitude A comprised in a range DT centred around the value INTc and of extension equal to twice the minimum value T_f of the tolerance T. In other words, the frequency response acquired is constituted by a range of values of amplitude A, which increase as the frequency F increases and are distributed around the value INTc.

Processing of the reference data with the measurement parameters and the temperature of the layer of material under examination for determining a measurement of the thickness of the layer itself (block 34 in FIG. 3) initially envisages extracting three first-approximation values of thickness S1, S2, S3 from the data of thickness S as a function of the frequency F for the three different temperatures T1, T2 and T3 using the intercept frequency F1_m.

In this connection, FIG. 10 illustrates an example of extraction of the first-approximation values of thickness S1, S2, S3 from the curves that express the data of thickness S as a function of the frequency F for the three temperatures T1, T2 and T3, said data being obtained during the step of calibration of the sensor 13.

Figure 7:
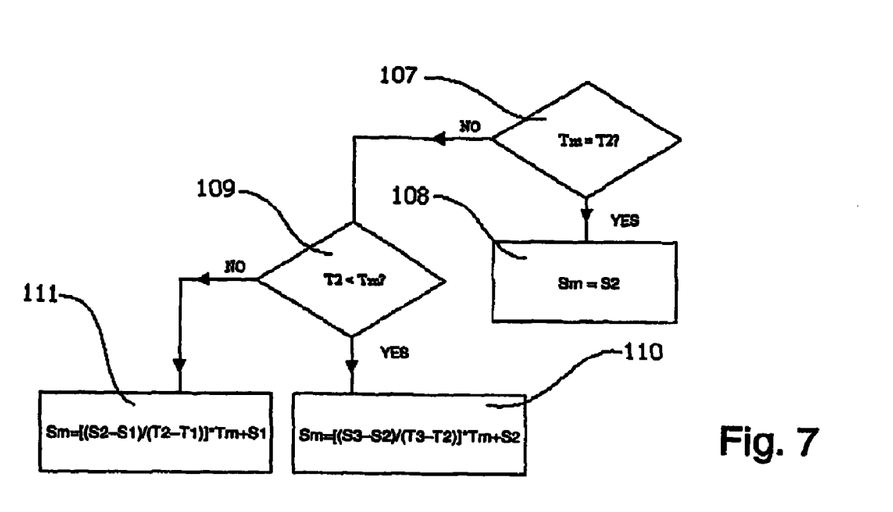

The measurement of thickness sought, indicated hereinafter by Sm, is obtained via an interpolation of the three first-approximation values of thickness S1, S2, S3 using the temperature of the material Tm. In greater detail, as illustrated in FIG. 7, the interpolation comprises the steps of:

comparing the value of the temperature of the material Tm with the temperature T2 (block 107): if the two temperatures are equal (Tm=T2), then the measurement of the thickness Sm is equal to S2 (block 108); otherwise, the flow proceeds with the next block 109;

comparing the value of the temperature of the material Tm with the temperature T2 (block 109): if the temperature T2 is below the temperature Tm (T2<Tm), then the measurement of thickness Sm is given by a first interpolation (block 110), $Sm = [(S3-S2)/(T3-T2)]*Tm+S2$;

otherwise the measurement of thickness Sm is given by a different interpolation (block 111)

$Sm = [(S2-S1)/(T2-T1)]*Tm+S1$.

According to a further embodiment of the present invention, the measurement parameters to be determined comprise a second value of intercept frequency F2_m and a mean value of minimum amplitude Amin_m of the frequency response of the layer of material.

The second value of intercept frequency F2_m is determined in a way similar to what was done for the first value of intercept frequency F1_m, i.e., it is determined substantially according to the flowchart illustrated in FIG. 6, but with the following differences:

the step indicated by block 60 envisages that the working frequency F of the sensor 13 is initially set to the value F1_m previously obtained, decremented by a programmable frequency shift DF1 of sufficiently wide value, for example, 15 MHz; and the comparison indicated by block 66 between the amplitude A acquired and the value INTc of intercept straight line is reversed; that is the condition A<INTc is replaced by the condition A>INTc.

Figure 8:
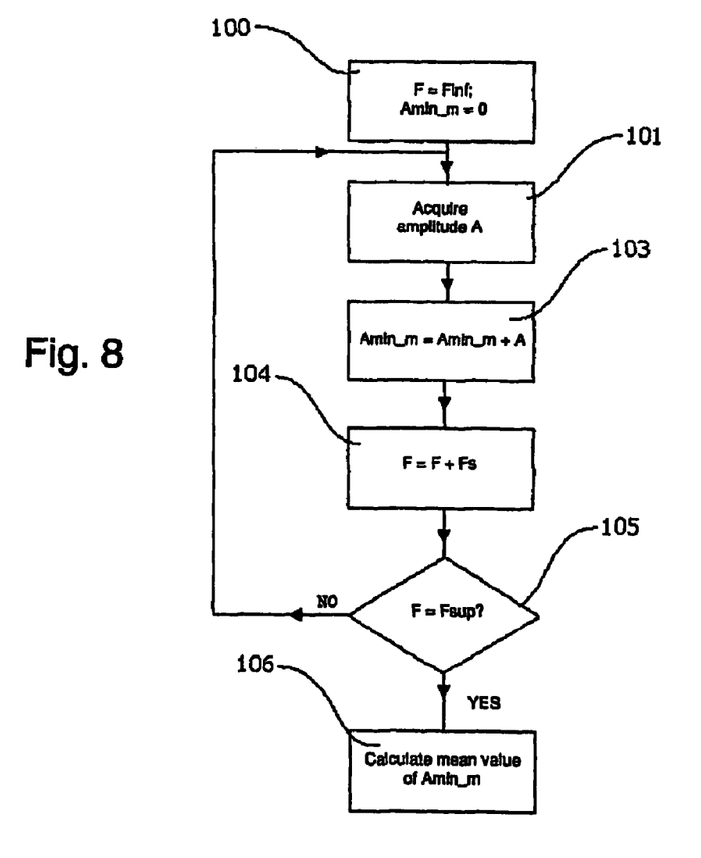

With reference to FIG. 8, the determination of the mean value of minimum amplitude Amin_m of the frequency response of the layer of material comprises the steps of:

initially setting the value of the working frequency F of the sensor 13 to a value Finf equal to (F1_m+F2_m)/2−DF2, in which the value DF2 is programmable and is, for example, equal to 1.25 MHz, and the minimum amplitude Amin_m to a zero starting value (block 100);

acquiring a value of amplitude A of the signal at output from the sensor 13 (block 101);

accumulating the value of amplitude A acquired, adding thereto the minimum amplitude Amin_m (Amin_m=Amin_m+A) (block 103);

incrementing the frequency F with a frequency step Fs of given value, and in particular of value equal to 10 kHz (F=F+10 kHz) (block 104);

comparing the frequency F with a value Sup equal to (F1_m+F2_m)/2+DF2 (block 105): if the frequency F is equal to Sup, then the flow proceeds to the next block 106; otherwise it returns to block 101; and calculating the mean value of minimum amplitude Amin_m sought as average of the values accumulated previously (block 106).

Figure 16:
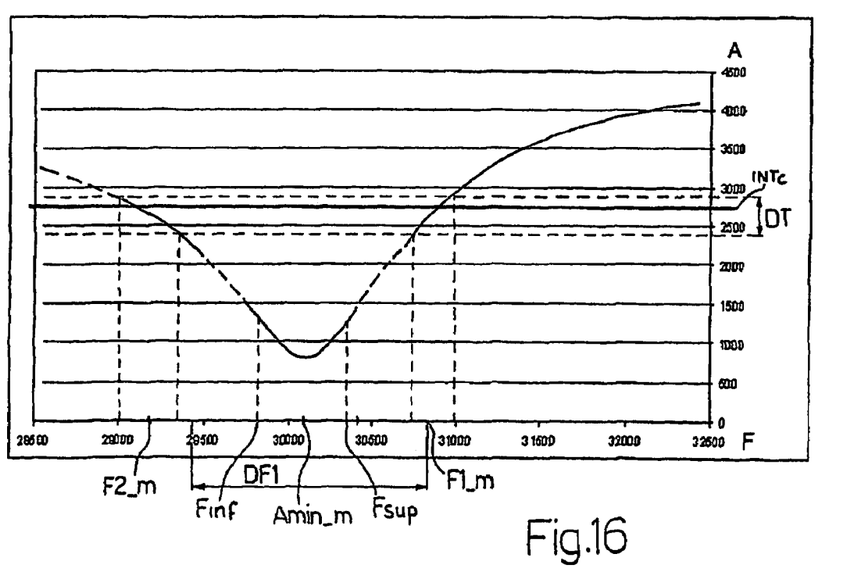

FIG. 16 illustrates an example of determination of the value of intercept frequency F2_m and of the minimum amplitude Amin_m. As may be noted, the frequency shift DF1 is to be chosen in order to speed up the search for the second value of intercept frequency F2_m, which it located substantially in a position symmetrical to the first value of intercept frequency F1_m with respect to the frequency so that the minimum value Amin_m is obtained, i.e., on a stretch of frequency response defined by a range of values of amplitude A, which decreases as the frequency F increases and is distributed around the value INTc.

According to said further embodiment of the present invention, processing of a part of the reference data with the measurement parameters (block 34 of FIG. 3) envisages processing the values of intercept frequency F1_m and F2_m and the value of minimum amplitude Amin_m by means of an artificial neural network implemented by a further control program that can be loaded into the microcontroller of the processing unit 21 for the purpose of increasing the precision of the measurement of thickness Sm.

What is claimed:

1. A method for measuring the thickness of a layer of first material, the method comprising:

acquiring at least one frequency response of the layer of first material via a microwave sensor;

setting the microwave sensor on a plurality of specimens of second materials for different temperature values to obtain reference data;

calibrating the microwave sensor as a function of the electrical conductivity of the first material using the reference data;

measuring the temperature of the layer of first material via a temperature sensor;

determining measurement parameters of the layer of first material from the frequency response; and processing the reference data with the measurement parameters and the measured temperature to obtain a measurement of the thickness of the layer of first material, wherein calibrating the microwave sensor comprises determining a calibration parameter as a function of the electrical conductivity of the first material and of first ones of said reference data.

2. The method according to claim 1, in which said measurement parameters of the layer of first material are determined by controlling acquisition of said frequency response as a function of said calibration parameter.

3. The method according to claim 1, in which said first reference data comprise data of electrical conductivity of said specimens of second materials as a function of a minimum amplitude of the frequency response of the specimens themselves; the data of electrical conductivity being obtained at a constant ambient temperature of given value and for one and the same value of thickness of the specimens.

4. The method according to claim 3, in which said first reference data comprise coefficients that define a linear function designed to supply said calibration parameter as a function of the measurement of the electrical conductivity of the first material.

5. The method according to claim 4, in which said coefficients are determined by: acquiring, via the microwave sensor and at constant temperature, a second plurality of frequency-response curves of a respective second plurality of specimens of said second materials, each having a respective electrical conductivity chosen from among a plurality of values of electrical conductivity and a thickness chosen from among a plurality of values of reference thickness; determining a plurality of mean values of amplitude that the response curves assume as the values of electrical conductivity vary in such a way that for each value of reference thickness the curves will detect a respective given frequency value; and performing (48) a linear regression on the points identified by the values of electrical conductivity and by the corresponding mean values of amplitude.

6. The method according to claim 3, in which said data of electrical conductivity are determined by acquiring, via the microwave sensor and at said ambient temperature, a first plurality of frequency-response curves of a respective first plurality of specimens of said second materials having respective values of electrical conductivity; and associating, to each of the values of electrical conductivity, a value of minimum amplitude of the frequency-response curve of the specimen that has said value of electrical conductivity.

7. The method according claim 1, in which said calibrating the microwave sensor comprises:

acquiring a frequency response of a specimen of said first material via the microwave sensor;

determining a value of minimum amplitude of said frequency response; and determining a measurement of the electrical conductivity of the first material as a function of said value of minimum amplitude using said data of electrical conductivity.

8. The method according to claim 7, in which calibrating the microwave sensor comprises compensating said value of minimum amplitude as a function of the difference between said ambient temperature and a value of measurement temperature that can be set by an operator.

9. The method according to claim 1, in which said processing the reference data envisages processing second ones of said reference data.

10. The method according to claim 9, in which said second reference data comprise data of thickness of said specimens of second materials having one and the same electrical conductivity, for a plurality of given temperature values.

11. The method according to claim 10, in which said data of thickness are obtained as the working frequency of the microwave sensor varies for each of said plurality of temperature values.

12. The method according to claim 11, in which said data of thickness are determined by: acquiring, for each value of said plurality of temperature values, a third plurality of frequency-response curves of a respective plurality of specimens having respective values of thickness; and associating, to each value of thickness, a respective value of said working frequency identified by the corresponding frequency-response curve for one and the same value of amplitude determined.

13. The method according to claim 10, in which said measurement parameters comprise a first intercept frequency determined by processing a first range of values of working frequency of the microwave sensor corresponding to a first range of values of amplitude of said frequency response of the layer of first material, in which said range has a given extension of value and is centred around a value of amplitude equal to said calibration parameter.

14. The method according to claim 13, in which processing of said data of thickness comprises:
    extracting a plurality of first-approximation values of thickness from the data of thickness corresponding to said plurality of temperature values using said first intercept frequency; and
    interpolating the first-approximation values of thickness using said temperature measured.

15. The method according to claim 13, in which said measurement parameters comprise: a second intercept frequency determined by processing a second range of values of working frequency separate from said first range of values of working frequency and corresponding to said first range of values of amplitude; and a value of minimum amplitude of the same frequency response, said value of minimum amplitude being obtained by processing a second range of values of amplitude corresponding to a third range of values of working frequency comprised between the first and the second intercept frequencies.

16. The method according to claim 1, comprising the storing said reference data.

17. A method for measuring the thickness of a layer of first material, the method comprising:
    acquiring at least one frequency response of the layer of first material via a microwave sensor;
    setting the microwave sensor on a plurality of specimens of second materials for different temperature values to obtain reference data;
    calibrating the microwave sensor as a function of the electrical conductivity of the first material using the reference data;
    measuring the temperature of the layer of first material via a temperature sensor;
    determining measurement parameters of the layer of first material from the frequency response; and
    processing the reference data with the measurement parameters and the measured temperature to obtain a measurement of the thickness of the layer of first material, in which said processing the reference data envisages processing second ones of said reference data, in which said second reference data comprise data of thickness of said specimens of second materials having one and the same electrical conductivity, for a plurality of given temperature values, in which said data of thickness are obtained as the working frequency of the microwave sensor varies for each of said plurality of temperature values, in which said measurement parameters comprise a first intercept frequency determined by processing a first range of values of working frequency of the microwave sensor corresponding to a first range of values of amplitude of said frequency response of the layer of first material, in which said range has a given extension of value and is centred around a value of amplitude equal to said calibration parameter, in which said measurement parameters comprise a second intercept frequency determined by processing a second range of values of working frequency separate from said first range of values of working frequency and corresponding to said first range of values of amplitude; and a value of minimum amplitude of the same frequency response, said value of minimum amplitude being obtained by processing a second range of values of amplitude corresponding to a third range of values of working frequency comprised between the first and the second intercept frequencies, in which said processing the reference data with the measurement parameters envisages processing said first and second intercept frequencies together with said value of minimum amplitude of the layer of first material by means of an artificial neural network in such a way as to increase the precision on said measurement of thickness.

18. A device for measuring the thickness of a layer of first material; the device comprising control means, and read means connected to the control means and designed to be set in contact with the layer of first material; the control means comprising a storage unit, an interface unit for communication with the read means, and a processing unit connected for communication with the storage unit and the interface unit; the read means comprising a microwave sensor and a temperature sensor; the processing unit being loaded with a control program designed for implementing, when run, operations comprising:
    acquiring at least one frequency response of the layer of first material via a microwave sensor; setting the microwave sensor on a plurality of specimens of second materials for different temperature values to obtain reference data;
    calibrating the microwave sensor as a function of the electrical conductivity of the first material using the reference data;
    measuring the temperature of the layer of first material via a temperature sensor;
    determining measurement parameters of the layer of first material from the frequency response; and processing the reference data with the measurement parameters and the measured temperature to obtain a measurement of the thickness of the layer of first material, wherein calibrating the microwave sensor comprises determining a calibration parameter as a function of the electrical conductivity of the first material and of first ones of said reference data.

* * * * *

UNITED STATES PATENT AND TRADEMARK OFFICE
CERTIFICATE OF CORRECTION

PATENT NO. : 8,138,769 B2
APPLICATION NO. : 12/161441
DATED : March 20, 2012
INVENTOR(S) : Giovanni Cristini Page 1 of 1

It is certified that error appears in the above-identified patent and that said Letters Patent is hereby corrected as shown below:

Title Page: After item (65), insert item (30) as follows:
-- (30) Foreign Application Priority Data
    Jan. 19, 2006 [IT] .......... MI2006A000084 --

Signed and Sealed this
Twenty-sixth Day of November, 2013

Margaret A. Focarino
*Commissioner for Patents of the United States Patent and Trademark Office*